United States Patent
Baldwin et al.

[11] Patent Number: 6,083,135
[45] Date of Patent: Jul. 4, 2000

[54] MULTIPLE SPEED OVERDRIVE TRANSMISSION FOR A MOTOR VEHICLE

[75] Inventors: Reid Alan Baldwin, Howell; Peter Hodges, Livonia; Volker Poenisch, Northville, all of Mich.

[73] Assignee: Ford Global Technologies, Inc., Dearborn, Mich.

[21] Appl. No.: 09/336,309

[22] Filed: Jun. 18, 1999

[51] Int. Cl.[7] .................................................. F16H 3/62
[52] U.S. Cl. ........................... 475/276; 475/277; 475/278
[58] Field of Search ............................ 475/276, 277, 475/278, 279

[56] References Cited

U.S. PATENT DOCUMENTS

| | | | |
|---|---|---|---|
| 3,863,524 | 2/1975 | Mori et al. ............................... | 475/276 |
| 3,971,268 | 7/1976 | Murakami et al. ....................... | 475/276 |
| 5,049,116 | 9/1991 | Asada ....................................... | 475/278 |
| 5,230,664 | 7/1993 | Michioka et al. ....................... | 475/276 |

*Primary Examiner*—Sherry L. Estremsky
*Attorney, Agent, or Firm*—Frank G. McKenzie

[57] ABSTRACT

A multiple speed transmission for motor vehicles includes three simple planetary gearsets, and hydraulically actuated friction clutches and brakes for controlling operation of the gearsets and altering the torque delivery path between an input shaft and an output shaft. A friction brake is provided for operation in reverse drive to share the torque reaction with another friction brake. The transmission is suited to produce six or seven forward speed ratios and a reverse drive ratio.

5 Claims, 2 Drawing Sheets

| | 48 | 50 | 52 | 54 | 56 | 60 | 62 |
|---|---|---|---|---|---|---|---|
| Gear | CL1 | CL2 | CL3 | CL4 | B1 | B2 | B3 |
| Reverse | X | X | | | X | | X |
| 1 | X | | | | X | X | |
| 2 | X | X | | | | X | |
| 3 | X | | X | | | X | |
| 4 | X | | | X | | X | |
| 5 | X | | X | X | | | |
| 6 | X | | | X | X | | |
| 7 | | | X | X | X | | |

| | 48 | 50 | 52 | 56 | 60 | 62 |
|---|---|---|---|---|---|---|
| Gear | CL1 | CL2 | CL3 | B1 | B2 | B3 |
| Reverse | X | | | X | | X |
| 1 | | | | X | X | |
| 2 | X | | | | X | |
| 3 | | X | | | X | |
| 4 | | | X | | X | |
| 5 | | X | X | | | |
| 6 | | | X | X | | |

MULTIPLE SPEED OVERDRIVE TRANSMISSION FOR A MOTOR VEHICLE

BACKGROUND OF THE INVENTION

1. Field of the Invention

The present invention relates to the field of automatic transmissions for motor vehicles. More particularly, it pertains to a kinematic arrangement having simple planetary gearsets.

2. Description of the Prior Art

Planetary gearsets used in automatic transmissions are controlled to produce multiple gear ratios by selectively engaging and disengaging clutches, which driveably connect and release connections among gearset components, and by selectively engaging and disengaging hydraulically operated brakes, which hold gearset components against rotation, thereby providing a torsional reaction, and release them for rotation.

Generally as the number of speed ratios produced by the transmission increases, the number of clutches and brakes required to control the transmission increases. However, each open or disengaged clutch and brake reduces operating efficiency of the transmission by causing drag between friction plates of the assembly. This drag is produced by shear forces transmitted across a narrow space filled with transmission fluid between the friction plates. Drag increases as fluid viscosity increases and as fluid temperature decreases.

SUMMARY OF THE INVENTION

It is preferred that the number of open friction clutches and brakes be minimized in a transmission capable of producing a large number of forward and reverse speed ratios.

It is an object of this invention to provide a multiple speed automatic transmission having six or seven forward speed ratios and reverse drive, each speed spaced from adjacent speeds in appropriate steps, the transmission having low parasitic losses and a minimum number of open friction clutches and brakes.

It is another object to provide an additional brake arranged in parallel with a hydraulically actuated friction brake to realize the advantage of reducing torque on the friction brake while it provides a torque reaction to the epicyclic gear unit.

It is an object to provide a transmission having multiple overdrive speed ratios in order to realize the advantage of excellent highway fuel economy.

In realizing these objects and advantages a multiple-speed transmission according to this invention includes an input; an output; a first gearset having a first sun gear, a first ring gear, a first carrier, a first planet pinion set rotatably supported on the first carrier and driveably engaged with the first sun gear and first ring gear; a second gearset having a second sun gear, a second ring gear driveably connected to the first carrier, a second carrier, a second planet pinion set rotatably supported on the second carrier and driveably engaged with the second sun gear and second ring gear; a third gearset having a third sun gear driveably connected to the second sun gear, a third ring gear driveably connected to the second carrier, a third carrier driveably connected to the output, a third planet pinion set rotatably supported on the third carrier and driveably engaged with the third sun gear and third ring gear; means for driveably connecting the input and first sun gear; a first clutch for alternately driveably connecting and disconnecting the first ring gear and second carrier; a second clutch for alternately driveably connecting and disconnecting any two of the group consisting of the first sun gear, first carrier and first ring gear; a third clutch for alternately driveably connecting and disconnecting the second carrier and input; a first brake for holding against rotation and releasing the first ring gear; and a second brake for holding against rotation and releasing the second and third sun gears.

A third brake is used to hold the second carrier against rotation and to release the second carrier for rotation.

The connecting means includes either a permanent connection between the input and first sun gear, or a fourth clutch for alternately driveably connecting and releasing the input and first sun gear.

DESCRIPTION OF THE PREFERRED EMBODIMENT

Figures 1, 2:
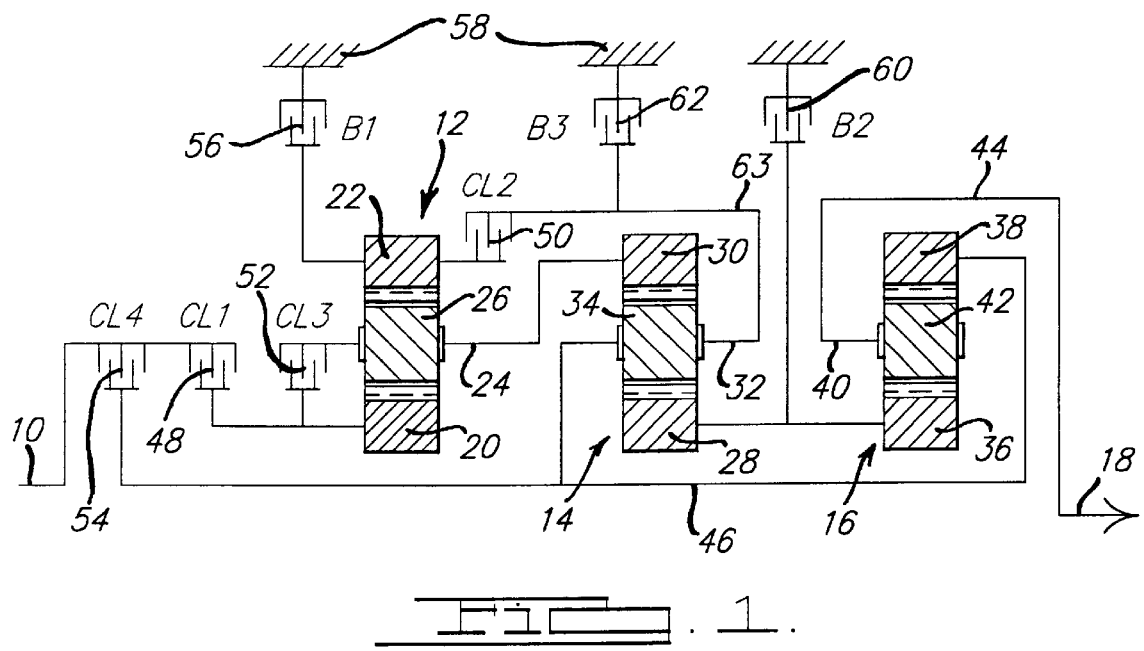
FIG. 1 is a schematic diagram of the kinematic arrangement of a transmission according to this invention.
FIG. 2 is a chart showing the engaged and disengaged state of the clutches and brakes corresponding to each speed ratio of the transmission of FIG. 1.

Referring to FIG. 1, a transmission according to this invention includes an input shaft 10, adapted for drive connection to a power source such as an internal combustion engine or electric motor; first, second and third gearsets 12, 14, 16; an output shaft 18, connected to the drive wheels of the vehicle; and several clutches and brakes for controlling operation of the gearsets.

Gearset 12 includes a sun gear 20 a ring gear 22 surrounding the sun gear, a carrier 24, and a set of planet pinions 26 rotatably supported on the carrier and. in continuous meshing engagement with the sun gear and ring gear. Preferably the ring gear 22/sun gear 20 size ratio is about 1.50.

Gearset 14 includes sun gear 28, ring gear 30 surrounding the sun gear, carrier 32, and a set of planet pinions 34 rotatably supported on the carrier and in continuous meshing engagement with sun gear 28 and ring gear 30. Preferably the diameter of ring gear 30 is about 1.88 times that of sun gear 28.

Gearset 16 includes a sun gear 36, ring gear 38, carrier 40, and a set of planet pinions 42 rotatably supported on the carrier and in continuous meshing engagement with sun gear 36 and ring gear 38. Preferably the diameter of ring gear 38 is about 3.05 times the diameter of sun gear 36.

Carrier 24 is driveably connected to ring gear 30. Sun gears 28 and 36 are mutually driveably connected. Carrier 40 is connected through a drum 44 to output shaft 18. Intermediate shaft 46 driveably connects carrier 32 and ring gear 38.

A hydraulically actuated friction clutch 48 driveably connects input shaft 10 and sun gear 20 when the clutch is engaged and releases that connection when the clutch is disengaged. Friction clutch 50 driveably connects ring gear 22 and carrier 32 when the clutch is engaged and releases that connection when the clutch is disengaged. Friction clutch 52 driveably connects sun gear 20 and carrier 24 when the clutch is engaged and releases that connection when the clutch is disengaged. Friction clutch 54 driveably connects input shaft 10 and intermediate shaft 46 when the clutch is engaged and releases that connection when the clutch is disengaged.

A hydraulically actuated friction brake 56 holds ring gear 22 fixed against rotation on the transmission housing 58 when the brake is applied and releases ring gear 22 to rotate when the brake is disengaged. The friction brake 60 driveably holds ring gears 28 and 36 against rotation on the transmission housing when the brake is applied and releases those sun gears to rotate when the brake is released.

A brake 62 located in a drive path between drum 63 and the transmission housing 58 holds drum 63 against rotation on the transmission housing when the brake is engaged and releases the drum for rotation when the brake is disengaged. Drum 63 driveably connects carrier 32 and clutch 50.

In operation, the first forward gear ratio results by engaging brakes 56, 60 and clutch 48, which connects the input shaft to sun gear 20 and causes brake 62 to overrun as it does in each forward drive ratio. Ring gear 22 provides a torque reaction due to the engagement of brake 56, and the output of gearset 12 is taken at carrier 24, which drives ring gear 30. A torque reaction is applied at sun gear 28 of gearset 14 due to the engagement of brake 58, and the output of gearset 14 is taken at carrier 32 and intermediate shaft 46, which drives ring gear 38. Sun gear 36 is held fixed against rotation and provides a torque reaction, the output of gearset 16 being taken at carrier 40, which directly drives output shaft 18.

An upshift to the second forward speed ratio results by maintaining clutch 48 and brake 60 engaged, and engaging clutch 50, which connects ring gear 22 and carrier 32 mutually. Sun gear 28 provided a torque reaction for gearsets 12 and 14, which underdrive carrier 32 and ring gear 38 with respect to the speed of input 10. Sun gear 36 provides a torque reaction at gearset 16, and its output at carrier 40 underdrives output shaft 18.

An upshift to the third forward speed ratio results by maintaining clutch 48 engaged, thereby connecting sun gear 20 to input shaft 10. Clutch 50 is disengaged, and clutch 52 is engaged, thereby driveably connecting carrier 24 and ring gear 30 to input shaft 10 through clutch 48. Brake 60 is maintained engaged thereby holding sun gears 28 and 36 fixed against rotation on the transmission housing. With the transmission control elements so disposed, gearset 14 reduces the speed of carrier 32, intermediate shaft 46 and sun gear 38 in relation to the speed of carrier 24 and input shaft 10. Finally, gearset 16 underdrives carrier 40 and output shaft 18 in relation to the speed of ring gear 38.

An upshift to the fourth gear, the highest underdrive ratio, results upon disengaging clutch 52, engaging clutch 54, and maintaining brake 60 and clutch 48 engaged. A torque reaction for gearset 16 is provided at sun gear 36 through brake 60, input shaft 10 drives ring gear 38 through clutch 54, and the output at carrier is underdriven with respect to the speed of shaft 10.

An upshift to the fifth forward speed ratio, a direct drive ratio, results by maintaining clutch 48 and brake 54 engaged, engaging clutch 52, and disengaging brake 60. With the transmission so disposed, the input shaft is driveably connected to sun gear 20, ring gear 38, carrier 32, carrier 24, and ring gear 30. As a result, ring gear 30, carrier 32 and sun gear 28 of gearset 14 rotate at the speed of input shaft 10, and sun gear 28 drives sun gear 36. Both ring gear 38 and sun gear 36 rotate at the speed of the input shaft, therefore, carrier 40 and output shaft 18 are driven at the speed of the input shaft.

An upshift to the sixth forward speed ratio, an overdrive ratio, occurs by maintaining clutches 48 and 54 engaged, disengaging clutch 52, and engaging brake 56. In this way, input shaft 10 is driveably connected through clutch 54 to carrier 32 of the second gearset 14, to ring gear 38 of the third gearset 16, and to sun gear 20 through clutch 48. A torque reaction is provided at ring gear 22 due to the engagement of brake 56, and the gearet 12 produces a speed reduction of carrier 24 and ring gear 30 in relation to the speed of the input shaft. Gearset 14 increases the speed of its output, sun gear 28, in relation to the speed of the input and drives sun gear 36 at the increased speed. Gearset 16 provides another speed increase of its carrier and output 18 in relation to the speed of input shaft 10.

An upshift to the seventh forward speed ratio, another overdrive ratio, occurs by disengaging clutch 48, engaging clutch 52, and maintaining clutch 54 and brake 56 engaged. This action driveably connects and holds sun gear 20, carrier 24 and ring gears 22, 30 fixed against rotation, and connects ring gear 38 and carrier 32 to input 10 through clutch 54. Input 10 drives carrier 32 through clutch 54, and the output of gearset 14, sun gear 28, overdrives sun gear 36 relative to the speed of input 10. Ring gear 38 is driven at the speed of input shaft 10 through clutch 54, and the output of gearset 16, carrier 40, drum 44 and output shaft 18, are overdiven further as a result of a speed increase produced in gearset 16.

Reverse drive ratio results by engaging clutches 48 and 50 and engaging brakes 56 and 62. This action holds ring gears 22 and 38, intermediate shaft 46, carrier 32 and drum 62 fixed against rotation on the transmission housing 58 through engagement of brakes 56 and 62. Torque required to provide the reaction on the transmission case is shared in parallel by friction brakes 56 and 62. Gearset 12 underdrives carrier 24 and ring gear 30 relative to the speed of input shaft 10. Gearset 14 reverses the rotary direction of sun gear 28 and sun gear 36. Gearset 16 further underdrives carrier 14 and output shaft 18 in the reverse direction compared to the speed and directional sense of input shaft 10.

Figures 3, 4:
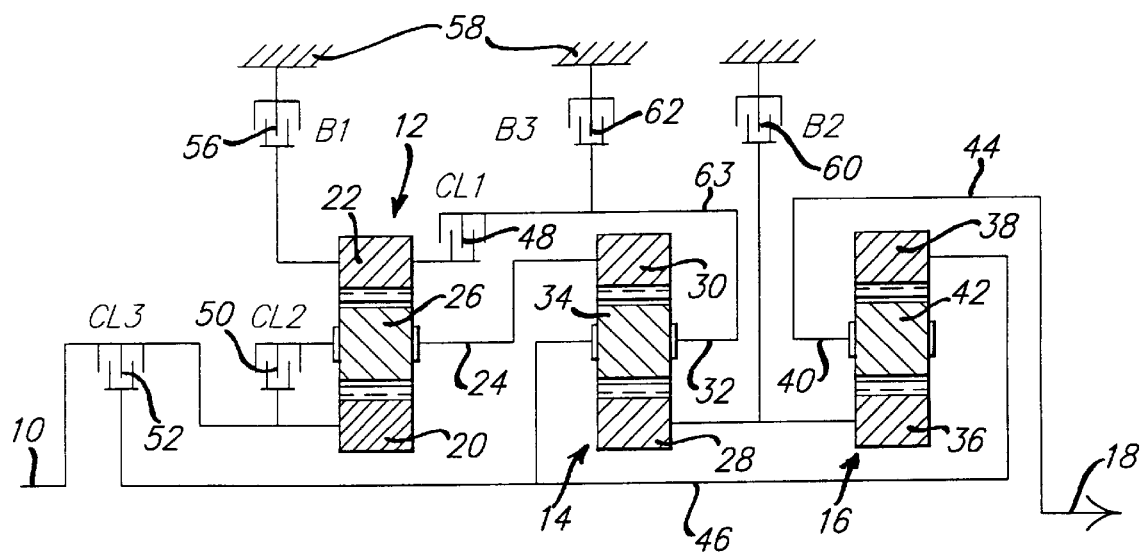
FIG. 3 is a schematic diagram of an alternate embodiment of a transmission according to this invention.
FIG. 4 is a chart showing the engaged and disengaged state of the clutches and brakes corresponding to each speed ratio of the transmission of FIG. 3.

FIG. 3 shows a kinematic arrangement similar to that of FIG. 1, except that clutch 48 is deleted and replaced by a continuous drive connection between sun gear 20 of gearset 12 and input shaft 10. In this configuration, the seventh forward speed ratio is inoperative because it requires connection of input 10 and sun gear 20, as described above with reference to FIGS. 1 and 2. Operation of the arrangement of FIGS. 3 and 4 is substantially identical to that of FIGS. 1 and 2 with respect to the reverse drive and six lowest forward drive ratios.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple-speed transmission for a motor vehicle, comprising:

an input;

an output;

a first gearset having a first sun gear, a first ring gear, a first carrier, a first planet pinion set rotatably supported on the first carrier and driveably engaged with the first sun gear and first ring gear;

a second gearset having a second sun gear, a second ring gear driveably connected to the first carrier, a second carrier, a second planet pinion set rotatably supported on the second carrier and driveably engaged with the second sun gear and second ring gear;

a third gearset having a third sun gear driveably connected to the second sun gear, a third ring gear driveably connected to the second carrier, a third carrier driveably connected to the output, a third planet pinion set rotatably supported on the third carrier and driveably engaged with the third sun gear and third ring gear;

means for driveably connecting the input and first sun gear;

a first clutch for alternately driveably connecting and disconnecting the first ring gear and second carrier;

a second clutch for alternately driveably connecting and disconnecting any two of the group consisting of the first sun gear, first carrier and first ring gear;

a third clutch for alternately driveably connecting and disconnecting the second carrier and input;

a first brake for alternately holding against rotation and releasing the first ring gear; and a second brake for alternately holding against rotation and releasing the second and third sun gears.

2. The multiple-speed transmission of claim 1, further comprising a third brake for alternately holding against rotation and releasing the second carrier.

3. The multiple-speed transmission of claim 1, wherein the connecting means comprises a permanent connection between the input and first sun gear.

4. The multiple-speed transmission of claim 1, wherein the connecting means comprises a fourth clutch for alternately driveably connecting and releasing the input and first sun gear.

5. A multiple-speed transmission for a motor vehicle, comprising:

an input;

an output;

a first gearset having a first sun gear, a first ring gear, a first carrier, a first planet pinion set rotatably supported on the first carrier and driveably engaged with the first sun gear and first ring gear;

a second gearset having a second sun gear, a second ring gear driveably connected to the first carrier, a second carrier, a second planet pinion set rotatably supported on the second carrier and driveably engaged with the second sun gear and second ring gear;

a third gearset having a third sun gear driveably connected to the second sun gear, a third ring gear driveably connected to the second carrier, a third carrier driveably connected to the output, a third planet pinion set rotatably supported on the third carrier and driveably engaged with the third sun gear and third ring gear;

a first clutch for alternately driveably connecting and disconnecting the first ring gear and second carrier;

a second clutch for alternately driveably connecting and disconnecting the first sun gear and first carrier;

a third clutch for alternately driveably connecting and disconnecting the second carrier and input;

a fourth clutch for alternately driveably connecting and disconnecting the first sun gear and input;

a first brake for holding against rotation and releasing the first ring gear;

a second brake for holding against rotation and releasing the second and third sun gears; and a third brake for alternately holding against rotation and releasing the second carrier.

\* \* \* \* \*